(12) United States Patent
Nickolls et al.

(10) Patent No.: US 7,711,990 B1
(45) Date of Patent: *May 4, 2010

(54) APPARATUS AND METHOD FOR DEBUGGING A GRAPHICS PROCESSING UNIT IN RESPONSE TO A DEBUG INSTRUCTION

(75) Inventors: John R. Nickolls, Los Altos, CA (US);
Roger L. Allen, Lake Oswego, OR (US);
Brian K. Cabral, San Jose, CA (US);
Brett W. Coon, San Jose, CA (US);
Robert C. Keller, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 490 days.

This patent is subject to a terminal disclaimer.

(21) Appl. No.: 11/302,952

(22) Filed: Dec. 13, 2005

(51) Int. Cl.
*G06F 11/00* (2006.01)
(52) U.S. Cl. .......................................... 714/37
(58) Field of Classification Search .................. 714/45, 714/37
See application file for complete search history.

(56) References Cited

U.S. PATENT DOCUMENTS

| | | | |
|---|---|---|---|
| 4,016,545 A * | 4/1977 | Lipovski ..................... 711/100 |
| 4,794,521 A * | 12/1988 | Ziegler et al. ............... 711/130 |
| 5,613,114 A | 3/1997 | Anderson et al. |
| 5,818,469 A | 10/1998 | Lawless et al. |
| 5,826,073 A * | 10/1998 | Ben-Meir et al. ........... 712/226 |
| 6,334,180 B1 * | 12/2001 | Petrick ........................ 712/34 |
| 6,336,178 B1 * | 1/2002 | Favor ......................... 712/23 |
| 6,341,347 B1 | 1/2002 | Joy et al. |
| 6,735,659 B1 | 5/2004 | Nakanishi et al. |
| 6,789,181 B1 * | 9/2004 | Yates et al. ..................... 712/4 |
| 6,915,414 B2 | 7/2005 | Yearsley et al. |
| 6,952,214 B2 | 10/2005 | Naegle et al. |
| 7,015,913 B1 | 3/2006 | Lindholm et al. |
| 2001/0014931 A1 | 8/2001 | Aglietti et al. |
| 2003/0046607 A1 * | 3/2003 | May et al. ..................... 714/25 |
| 2003/0126367 A1 | 7/2003 | Revilla et al. |
| 2003/0140179 A1 | 7/2003 | Wilt et al. |
| 2003/0212874 A1 * | 11/2003 | Alderson .................... 711/170 |
| 2004/0015899 A1 * | 1/2004 | May et al. ................... 717/140 |
| 2004/0243984 A1 * | 12/2004 | Vorbach et al. ............. 717/136 |
| 2005/0022062 A1 * | 1/2005 | Vorbach ....................... 714/38 |
| 2005/0270370 A1 * | 12/2005 | Uemura et al. ................ 348/79 |
| 2006/0090062 A1 * | 4/2006 | Vorbach et al. ............. 712/226 |
| 2007/0103474 A1 | 5/2007 | Huang et al. |

* cited by examiner

*Primary Examiner*—Scott T Baderman
*Assistant Examiner*—Yair Leibovich
(74) *Attorney, Agent, or Firm*—Cooley Godward Kronish LLP

(57) ABSTRACT

A system includes a graphics processing unit with a processor responsive to a debug instruction that initiates the storage of execution state information. A memory stores the execution state information. A central processing unit executes a debugging program to analyze the execution state information.

17 Claims, 5 Drawing Sheets

APPARATUS AND METHOD FOR DEBUGGING A GRAPHICS PROCESSING UNIT IN RESPONSE TO A DEBUG INSTRUCTION

BRIEF DESCRIPTION OF THE INVENTION

This invention relates generally to graphics processing. More particularly, this invention relates to a technique for using a debug instruction to capture execution state of a program executing on a graphics processing unit to facilitate debugging operations.

BACKGROUND OF THE INVENTION

Currently there are very few tools available to software developers that provide visibility into the state of a graphics processing unit (GPU) or the state of a program executing on a GPU. Thus, it is difficult for software developers to identify the origin of problems that may be associated with programs that they are developing. For example, many GPUs have several shader processors that execute many instances of graphics shader programs, with initial shaders being used to position a triangle and a subsequent shader used to apply color. To understand a problem associated with a program running on a GPU it may be necessary to understand the state of each shader program instance on a step-by-step basis. Developers generally do not have access to the GPU processor or program state information required for this type of analysis.

Capturing state information associated with the operation of a central processing unit (CPU) is known. For example, in the case of an error in the CPU, it is known to capture all state information of the CPU at the time of the error. The state information may include register values, pointers, program counters, condition codes and the like. Various debugging tools may then be used to analyze the state information.

It would be desirable to be able to capture state information associated with the operation of a GPU. Ideally, this would be accomplished without dedicated circuitry required to capture the state information. In other words, it would be desirable to capture GPU state information using existing circuitry associated with the GPU. If such state information was made available to a developer, standard debugging tools could be used to analyze the state information and thereby provide developers with a new technique to improve their applications.

SUMMARY OF THE INVENTION

The invention includes a system with a graphics processing unit with a processor responsive to a debug instruction that initiates the storage of execution state information. A memory stores the execution state information. A central processing unit executes a debugging program to analyze the execution state information.

The invention includes a graphics processing unit with a processor responsive to a debug instruction. A host interface coordinates the storage of execution state information in response to the debug instruction.

The invention also includes a method of operating a graphics processing unit. A graphics processing unit is monitored for a debug instruction. The graphics processing unit execution state information is saved in response to the debug instruction. The graphics processing unit execution state information is then debugged.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
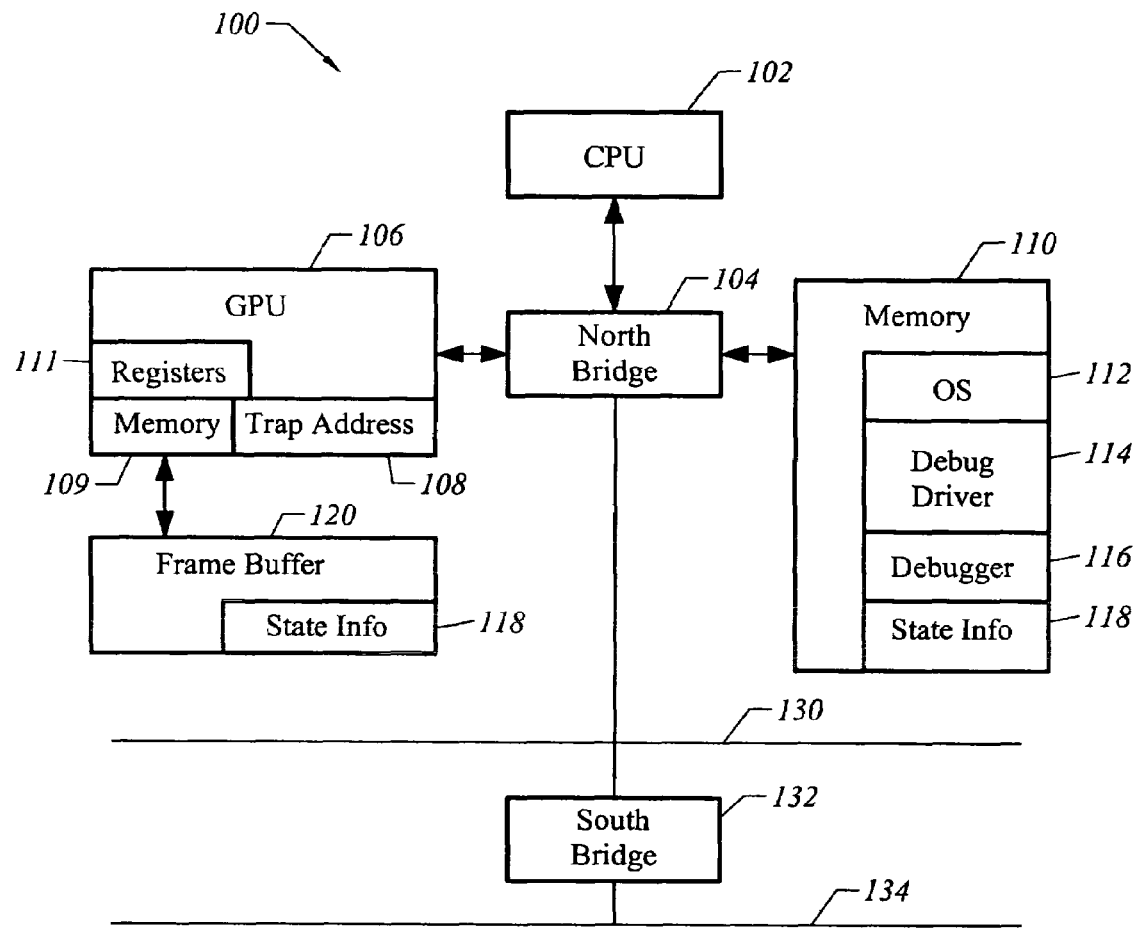
FIG. 1 illustrates a system configured in accordance with an embodiment of the invention.

FIG. 1 illustrates a system 100 configured in accordance with an embodiment of the invention. The system 100 includes a CPU 102 connected to a bridge 104 (e.g., a standard north bridge known in the art). A GPU 106 is also connected to the bridge 104. The system 100 is configured to support the operations of the invention. In particular, the GPU 106 is configured to support debug operations in response to a debug instruction. The debug instruction may be a trap instruction, which utilizes existing GPU page fault mechanisms to initiate the saving of state information. Subsequently, the GPU operates with the CPU to save state information. Alternately, the debug instruction may be a breakpoint instruction added to an instruction set. The GPU processes the breakpoint instruction and operates with the CPU to save state information. In some embodiments, the GPU may have a single-instruction step mode, wherein the GPU acts as if a debug instruction followed each actual instruction. Debugging operations are performed on saved state information, regardless of the technique used to secure the state information.

When the GPU executes a debug instruction such as a trap instruction or breakpoint instruction, it causes a debugging event signal, which in some embodiments is a trap signal. The debugging event signal may be caused by an explicit debug instruction or it may be generated in response to the monitoring of specified criteria, such as a performance value, an error value or a register comparison value. In one embodiment of the invention, the trap instruction utilizes existing GPU page fault mechanisms to initiate the saving of state information. As known in the art, page faults occur in processors and CPUs in response to instruction accesses (e.g., load/store/branch/call) to virtual addresses that are not mapped to a physical address or are invalid. On a processor or CPU, a page fault invokes a page fault handler that establishes a virtual to physical mapping and resumes execution of the faulting instruction or signals an error if the address is invalid. If servicing the page fault will take a long time, the processor or CPU may switch contexts to another process or thread. The context switch results in state information being stored until the state information is needed in response to a subsequent context switch. Context switching may be time-expensive. In one embodiment of the invention, the GPU has a memory management unit that generates GPU page faults which are serviced by the CPU, and a debugging event signal invokes GPU page faults at a specific invalid address which informs the CPU to then perform GPU debugging operations. In one embodiment, the CPU causes a GPU context switch that saves debug state information in a memory. For example, the state information 118 may be captured in the frame buffer 120, system memory 110 or memory 109 resident on the GPU 106.

The memory 110 of FIG. 1 stores an operating system (OS) 112. As known in the art, operating systems control the virtual memory space associated with a computer. The virtual memory space includes valid page references and invalid page references. Reference to an invalid page results in a page fault.

The memory 110 also stores a debug driver 114. The debug driver 114 includes executable instructions to specify the address of an invalid page reference that will create a page fault, and route this invalid address to the GPU 106 so that it may be stored as a trap address 108. When the CPU 102 subsequently sees a request for the specified invalid page reference, it initiates debugging operations rather than service it as a normal page fault. In particular, the CPU 102 recognizes that a call to the invalid page reference is in response to a request for debugging operations and therefore the CPU 102 initiates a context switch. The context switch results in the saving of state information. Thereafter, the debugger 116 may analyze the state information.

The debugger 116 includes executable instructions to analyze state information. Standard techniques may be used to analyze the state information. However, in this implementation, the standard techniques are applied to GPU state information, not CPU state information. FIG. 1 illustrates the state information 118 stored in memory 110 so that it may be operated on by the debugger 116. The state information 118 may be routed from the frame buffer 120 using standard techniques. Alternately, the state information 118 may be directly routed from the memory 109 of GPU 106 to the memory 110.

FIG. 1 also illustrates that a bus 130 (e.g., a PCI bus) is connected to the bridge 104. A south bridge 132 may also be connected to the bus 130. An additional bus 134 (e.g., an ISA bus) may be connected to the south bridge 132. These components are shown for the purpose of demonstrating that the invention may be incorporated into a general computing platform.

Figure 2:
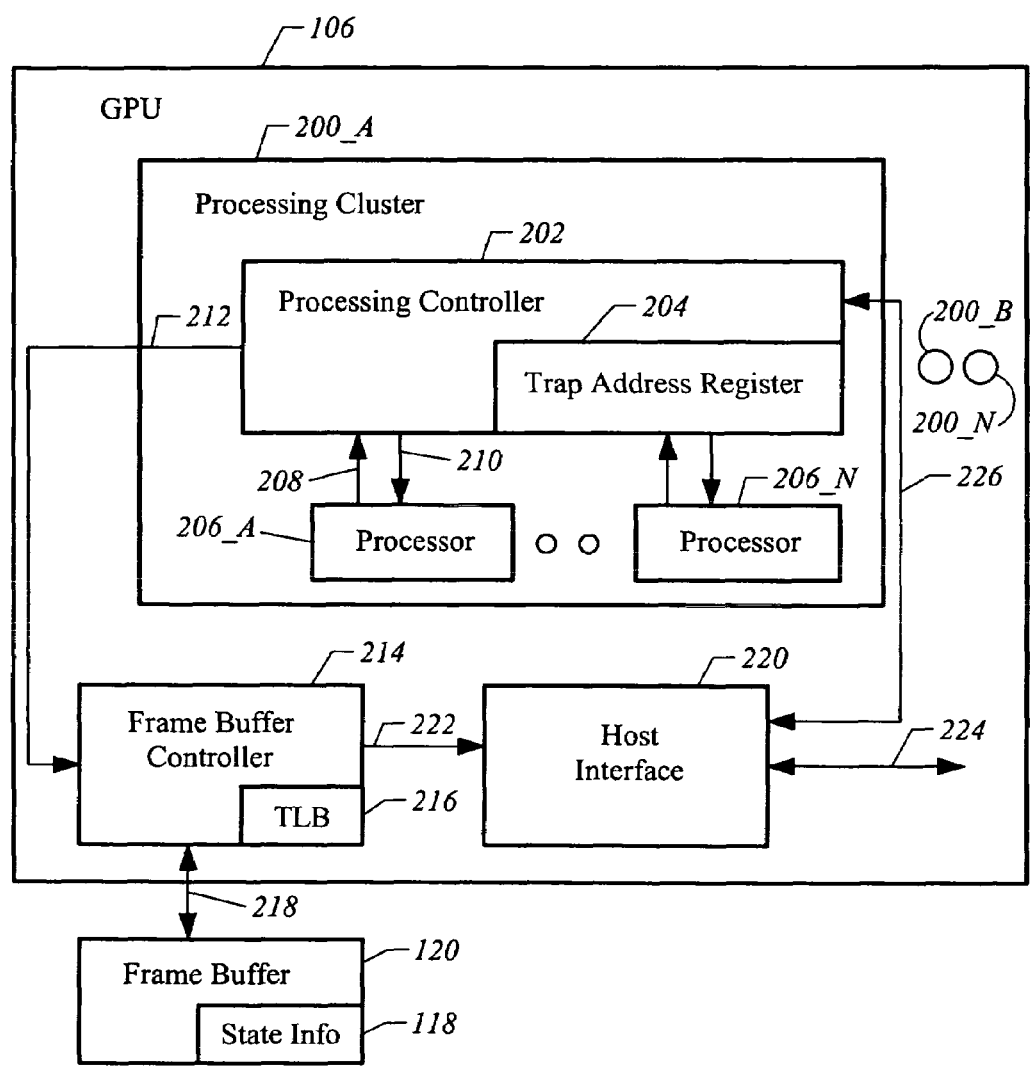
FIG. 2 illustrates a GPU configured in accordance with an embodiment of the invention.

FIG. 2 is a more detailed illustration of a GPU 106 implemented in accordance with an embodiment of the invention. In this embodiment, the GPU 106 includes a set of processing clusters 200_A through 200_N (also referred to as processors). To simplify the illustration, only processing cluster 200_A is shown in detail. Each processing cluster 200 includes a processing controller 202 (or processor controller). The processing controller 202 includes a trap address register 204 to store the previously discussed trap address.

The processing controller 202 is in communication with a set of processors 206_A through 206_N. In one embodiment, each processor 206 is a multi-threaded processor. Under predetermined conditions, as discussed below, a trap signal to be used as a debugging event is generated by a processor 206 and is applied on line 208 to the processing controller 202. This causes the trap address register 204 to route its stored trap address over line 212 to the frame buffer controller 214. In particular, the trap address is received by the translation lookaside buffer (TLB) 216 of the frame buffer controller 214. The TLB 216 attempts to access the trap address. As previously indicated, the trap address is an address that is known to cause a page fault. Thus, an access to the trap address results in a page fault. The page fault is communicated over line 222 to the host interface 220, which communicates the page fault to the CPU 102 via line 224. The CPU 102 recognizes the specified page fault address as corresponding to a request for a debug operation. Therefore, the CPU 102 initiates a context switch. For example, the CPU 102 may apply a signal to the host interface 220 via line 224. The host interface may then relay the signal to the processing controller 202, which processes the context switch command in a standard manner to produce state information. Alternately, the host interface 220 may be configured to generate the context switch command in response to the page fault. Regardless of the implementation, all state information at the time of the page fault is captured and stored in memory (e.g., in the frame buffer 120, system memory 110, and/or GPU memory 109). In particular, to store state in the frame buffer 120, the state information is routed from the processor 208, to the frame buffer controller 214 over line or bus 212. In turn, the frame buffer controller 214 stores the state information 118 in the frame buffer 120.

The CPU 102 may also reply to the host interface 220 with instructions to halt additional processors 206 or particular threads operating on those processors. In one embodiment, the system is configured to halt all threads associated with a multi-threaded processor that produces a page fault. Alternately, the system is configured to halt all of the multi-threaded processors of a processing cluster 200. In sum, the halt command may be configurable. The halt command is applied to the processing controller 202 over line 226. Standard techniques are used to implement the halt operation. The host interface 220 may be configured to generate halt commands without reliance upon the CPU.

Figure 3:
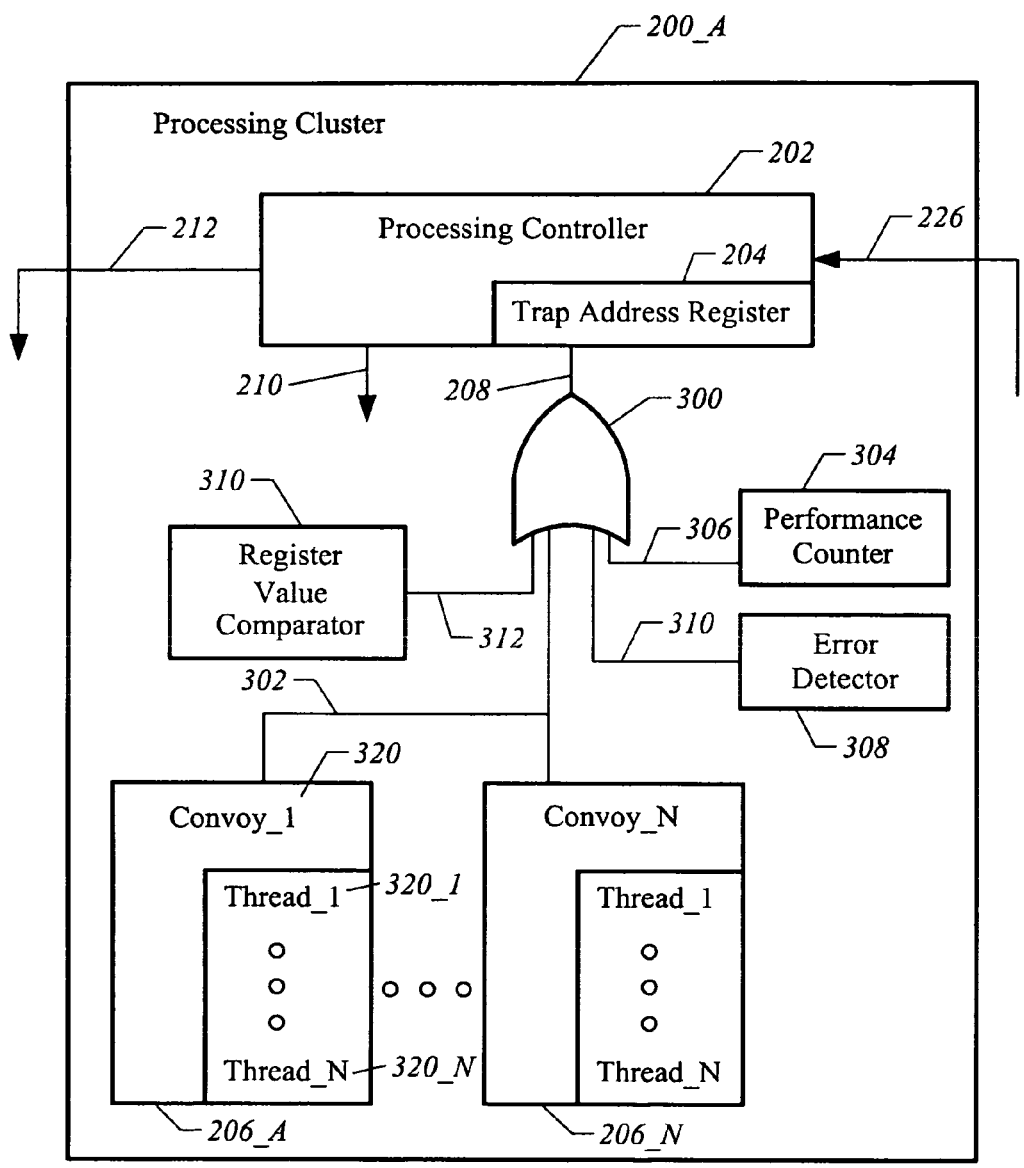
FIG. 3 is a more detailed view of a processing cluster of a GPU configured in accordance with an embodiment of the invention.

FIG. 3 is a more detailed illustration of a processing cluster 200_A of the GPU 106. FIG. 3 illustrates that in this embodiment each processor 206 is a multi-threaded processor with a convoy 320 of threads 320_1 through 320_N. In other words, in this embodiment, each processor 206 includes circuitry to process a set of computational threads.

In one embodiment of the invention, each multi-threaded processor 206 is configured to recognize a trap instruction. The trap instruction is part of the instruction set that runs on each multi-threaded processor 206. The trap instruction operates as a call to the trap address register 204. As previously indicated, this results in the trap address within the trap address register being requested via the TLB 216, which results in a page fault and the saving of state information. The trap instruction may be conveyed over line 302.

In accordance with the invention, other techniques may be used to call the address in trap address register 204, generate a page fault and save state information. As shown in FIG. 3, a logical OR gate 300 may be used to test for a variety of conditions that will result in the saving of state information. For example, a performance counter 304 may be used. The performance counter 304 may be used to track any metric associated with the operation of a processor 206. For example, the performance counter 304 may count the number of instructions executed by a processor 206. This may be done on a per thread basis or across all threads. When a count limit is reached, the performance counter 304 produces a digital high signal, which is applied to the logical OR gate, resulting in state information being saved. The performance counter 304 facilitates the saving of state information in incremental steps. This allows one to acquire state information on a step-by-step basis.

An error detector 308 may also be used in accordance with an embodiment of the invention. The error detector 308 may be configured to produce a digital high signal in the event that a processor 206 enters any number of states deemed to be error states. Preferably, the error states are configurable. This allows a developer to fetch state information under specified conditions.

A register value comparator 310 may also be used to test for other conditions that may trigger debug operations. For example, the register value comparator 310 may be configured to compare a current program counter value to an expected program counter value. This permits single step analysis of program instructions.

Figure 4:
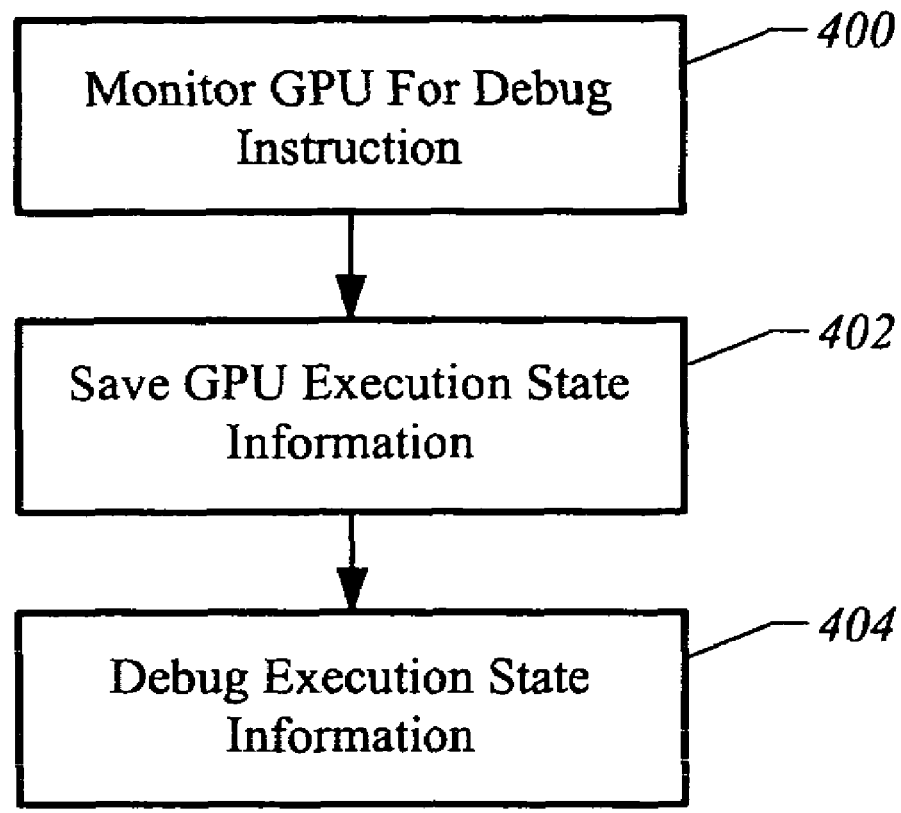
FIG. 4 illustrates processing operations associated with an embodiment of the invention.

FIG. 4 illustrates processing operations associated with an embodiment of the invention. In one mode of operation, a GPU is monitored for a debug instruction 400, such as a trap instruction or a breakpoint instruction. The GPU execution state information is then saved 402 through the coordinated operations of the GPU and the CPU. The final processing operation of FIG. 4 is to debug the execution state information 404. Once the state information is secured in accordance with the invention, standard techniques may be used to debug the state information. For example, debugger 116 of FIG. 1 may be used to implement this operation.

Figure 5:
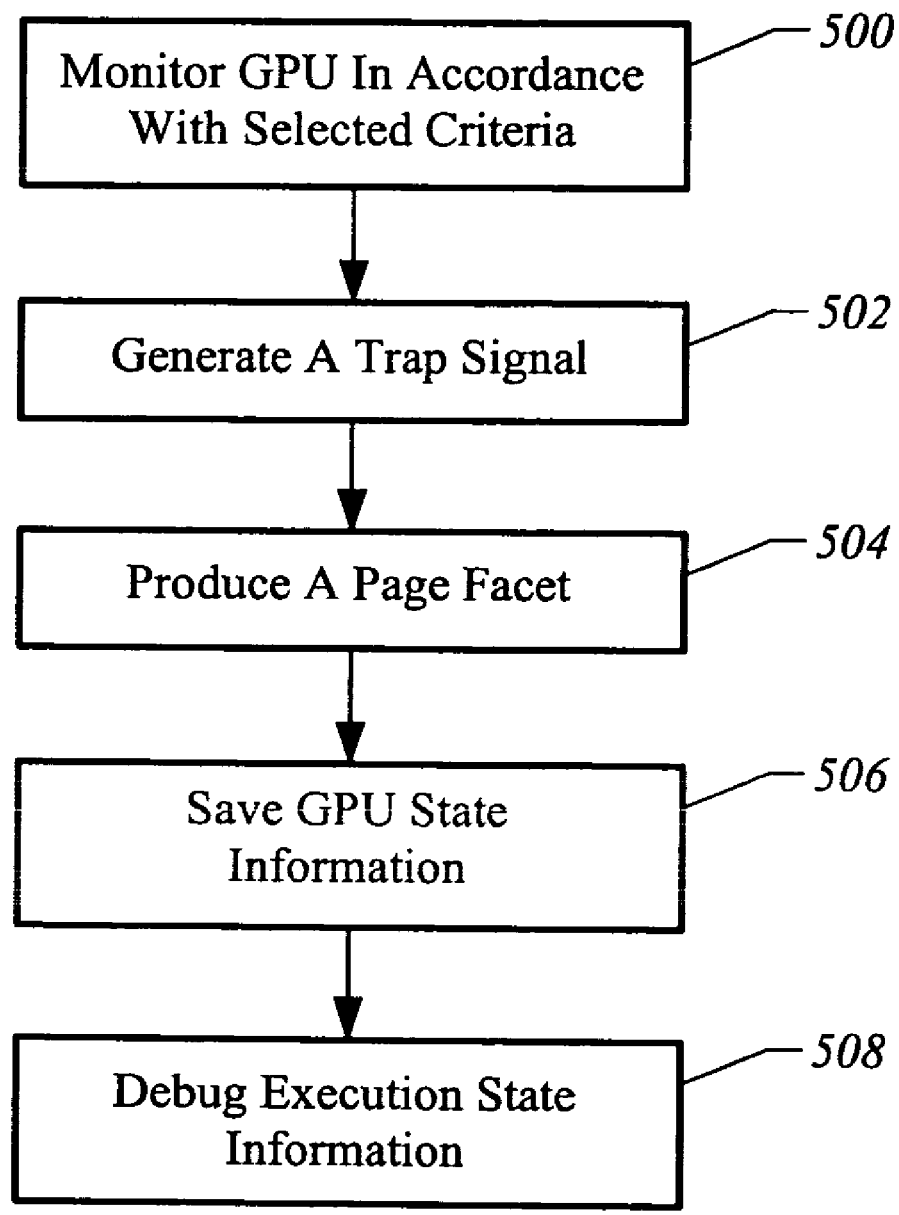
FIG. 5 illustrates processing operations associated with an alternate embodiment of the invention.

FIG. 5 illustrates processing operations associated with another embodiment of the invention. This embodiment does not contemplate the use of a breakpoint instruction. Rather, this embodiment relies upon a trap instruction and a page fault mechanism. Initially, the GPU is monitored in accordance with selected criteria associated with a trap instruction. The selected criteria may be a performance value, an error value, a register comparator value, or a trap instruction. In response to the occurrence of a specified event, a trap signal is generated 502. Thus, for example, as shown in FIGS. 2 and 3, a trap signal may be routed to the processing controller 202 via line 208.

The next operation of FIG. 5 is to produce a page fault 504. As previously indicated, the trap address from the trap address register 204 may be routed to the TLB 216 of the frame buffer controller 214. An attempt to access the address results in a page fault.

GPU state information is then saved 506. The state information 118 may be stored in a memory (e.g., frame buffer 120). The state information 118 may also be routed to memory 110. The final operation of FIG. 5 is to debug the state information 508. Debugger 116 may be used to implement this operation.

Those skilled in the art will appreciate that the invention provides a technique for securing state information associated with a GPU. Dedicated circuitry is not required to obtain this information. Instead, in the case of a trap instruction, the state information is secured by using resident page fault and context switch mechanisms. The invention strategically invokes page faults to secure state information. This is highly advantageous in a GPU environment, where it is difficult to create precise stop points, particularly in a multi-threaded environment. The invention provides a general debug tool for a GPU.

The invention may also be implemented with a GPU breakpoint instruction that does not rely upon a page fault mechanism. In such an embodiment, the breakpoint instruction is added to the instruction set. The instruction temporarily freezes the thread that executes it and generates a debugging event signal, e.g., on line 208 of FIG. 2. In the case of the breakpoint instruction, the trap address register is not utilized. Instead, the breakpoint instruction causes the processing controller 202 to send a signal on line 226 to the host interface 220, which signals the CPU over line 224 that a GPU breakpoint has been reached. The breakpoint signal optionally freezes other threads in the same processor, and/or in other GPU processors.

The breakpoint instruction may be used in a selectable single step mode that executes one instruction per thread, then acts as if the GPU processor executed a breakpoint instruction following that instruction, causing a debugging event signal. The debugging program 116 in cooperation with the debug driver 114, may issue an instruction to the host interface 220 to stop the GPU, read/write the state of frozen GPU threads, read a per-thread break bit to determine which threads have experienced a debugging event, modify their PCs, modify instructions, and then resume GPU execution. The debug driver 116 reads and writes GPU control registers 111 via the host interface 220 to access GPU state. Because the GPU is in a frozen state while debugging GPU programs, a second GPU may be used to provide a display for the CPU if desired.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising:
a graphics processing unit with
a processor to execute a debug instruction;
a frame buffer controller responsive to the execution of the debug instruction by the processor to access a trap address known to cause a page fault and thereby create a page fault to initiate the storage of graphics processing unit execution state information;
a memory to store the graphics processing unit execution state information; and
a central processing unit to execute a debugging program to analyze the graphics processing unit execution state information.

2. The system of claim 1 wherein the processor executes a debug instruction in the form of a trap signal.

3. The system of claim 2 wherein the trap signal initiates the page fault and a context switch to save the execution state information.

4. The system of claim 1 wherein the processor executes a debug instruction in the form of a breakpoint signal processed by the central processing unit, which coordinates the storage of execution state information.

5. The system of claim 1 wherein the memory is selected from a graphics processing unit memory, a frame buffer memory and system memory.

6. A graphics processing unit, comprising:
a processor to execute a debug instruction;
a frame buffer controller responsive to the processor executing the debug instruction by attempting to access a reserved page and thereby creating a page fault; and
a host interface to coordinate storage of graphics processing unit execution state information in response to the page fault.

7. The graphics processing unit of claim 6 wherein the host interface produces a context switch command in response to the page fault to store the execution state information.

8. The graphics processing unit of claim 6 wherein the host interface communicates the page fault to a central processing unit and responds to a context switch command from the central processing unit to store the graphics processing unit execution state information.

9. The graphics processing unit of claim 6 wherein the debug instruction is a breakpoint instruction that causes the host interface to apply a signal to a central processing unit.

10. A method of operating a graphics processing unit, comprising:
- executing a debug instruction on a graphics processing unit, wherein executing includes executing a trap instruction;
- accessing a trap address known to cause a page fault in response to the debug instruction and thereby creating a page fault;
- saving graphics processing unit execution state information in response to the page fault; and
- debugging the graphics processing unit execution state information using a debugger executed by a central processing unit.

11. A method of operating a graphics processing unit, comprising:
- monitoring a performance counter;
- executing a debug instruction on a graphics processing unit;
- accessing a trap address known to cause a page fault in response to the debug instruction and thereby creating a page fault;
- saving graphics processing unit execution state information in response to the page fault; and
- debugging the graphics processing unit execution state information using a debugger executed by a central processing unit.

12. A method of operating a graphics processing unit, comprising:
- monitoring an error detector;
- executing a debug instruction on a graphics processing unit;
- accessing a trap address known to cause a page fault in response to the debug instruction and thereby creating a page fault;
- saving graphics processing unit execution state information in response to the page fault; and
- debugging the graphics processing unit execution state information using a debugger executed by a central processing unit.

13. A method of operating a graphics processing unit, comprising:
- monitoring a register comparison value;
- executing a debug instruction on a graphics processing unit;
- accessing a trap address known to cause a page fault in response to the debug instruction and thereby creating a page fault;
- saving graphics processing unit execution state information in response to the page fault; and
- debugging the graphics processing unit execution state information using a debugger executed by a central processing unit.

14. A method of operating a graphics processing unit, comprising:
- executing a debug instruction on a graphics processing unit;
- accessing a trap address known to cause a page fault in response to the debug instruction and thereby creating a page fault;
- saving graphics processing unit execution state information in response to the page fault, wherein saving includes saving graphics processing unit execution state information in response to a page fault to a reserved page; and
- debugging the graphics processing unit execution state information using a debugger executed by a central processing unit.

15. A method of operating a graphics processing unit, comprising:
- executing a debug instruction on a graphics processing unit;
- accessing a trap address known to cause a page fault in response to the debug instruction and thereby creating a page fault;
- saving graphics processing unit execution state information in response to the page fault, wherein saving includes saving graphics processing unit execution state information in response to a context switch responsive to the page fault; and
- debugging the graphics processing unit execution state information using a debugger executed by a central processing unit.

16. A method of operating a graphics processing unit, comprising:
- executing a debug instruction on a graphics processing unit;
- accessing a trap address known to cause a page fault in response to the debug instruction and thereby creating a page fault;
- saving graphics processing unit execution state information in response to the page fault;
- debugging the graphics processing unit execution state information using a debugger executed by a central processing unit;
- securing a reserved page address from an operating system; and
- loading the reserved page address in the graphics processing unit.

17. A method of operating a graphics processing unit, comprising:
- monitoring for a breakpoint instruction
- executing a debug instruction on a graphics processing unit;
- accessing a trap address known to cause a page fault in response to the debug instruction and thereby creating a page fault;
- saving graphics processing unit execution state information in response to the page fault; and
- debugging the graphics processing unit execution state information using a debugger executed by a central processing unit.

* * * * *